Patented Oct. 3, 1922.

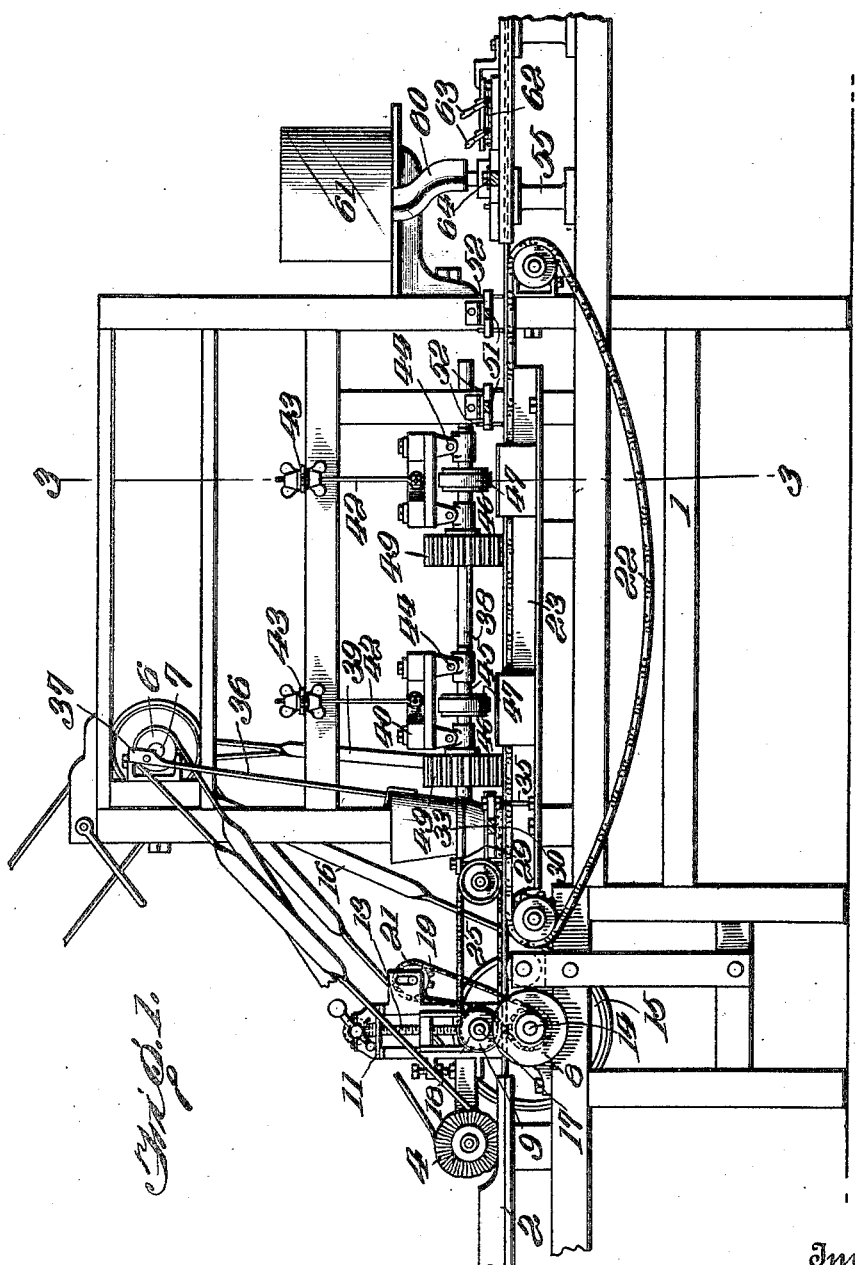

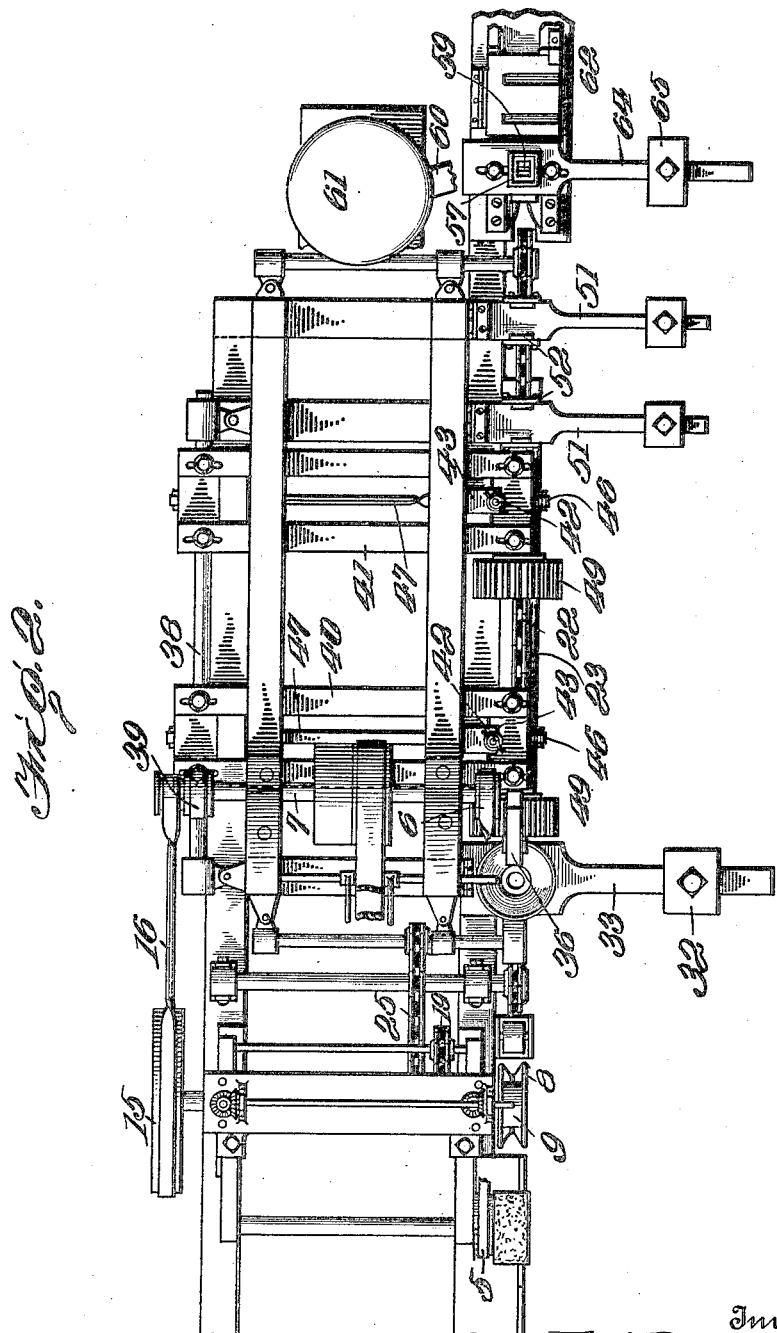

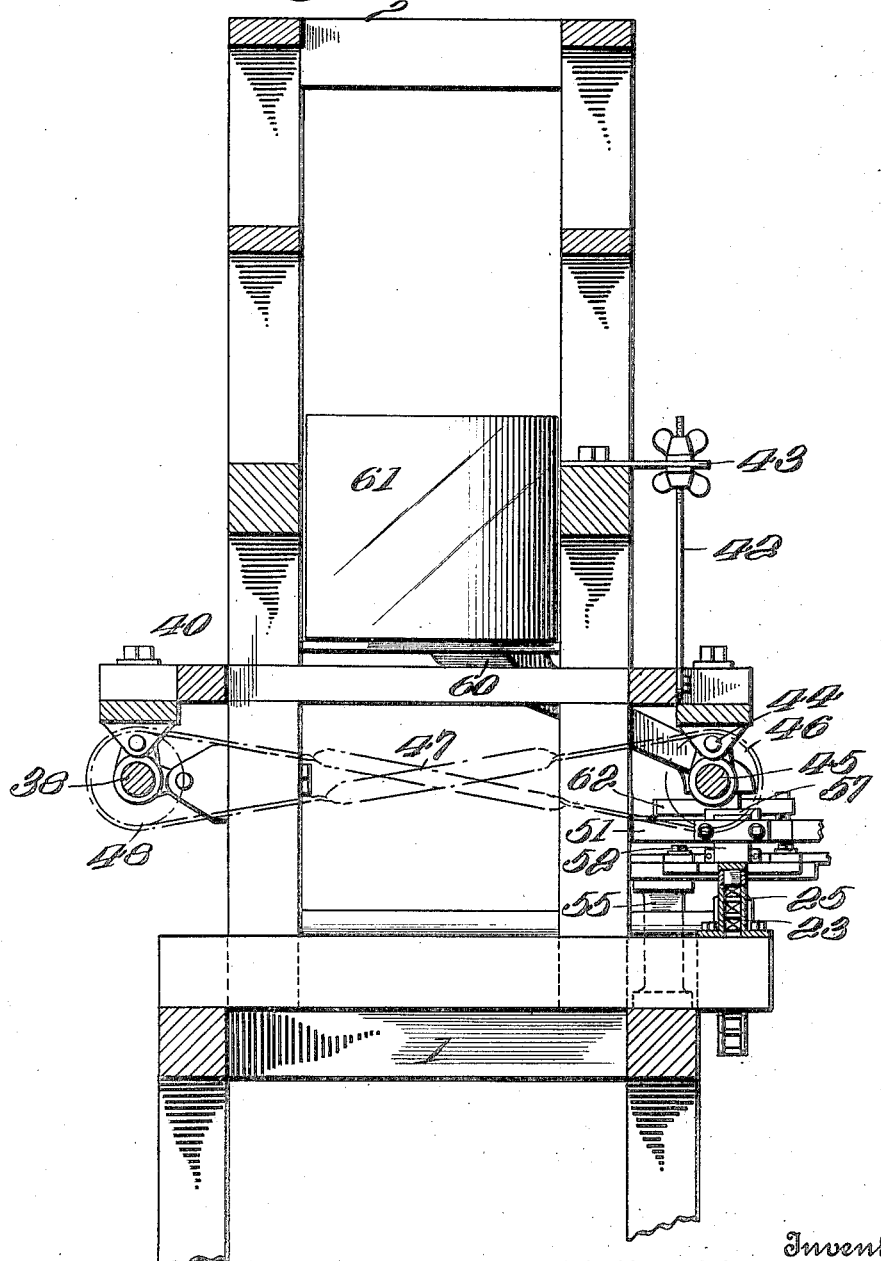

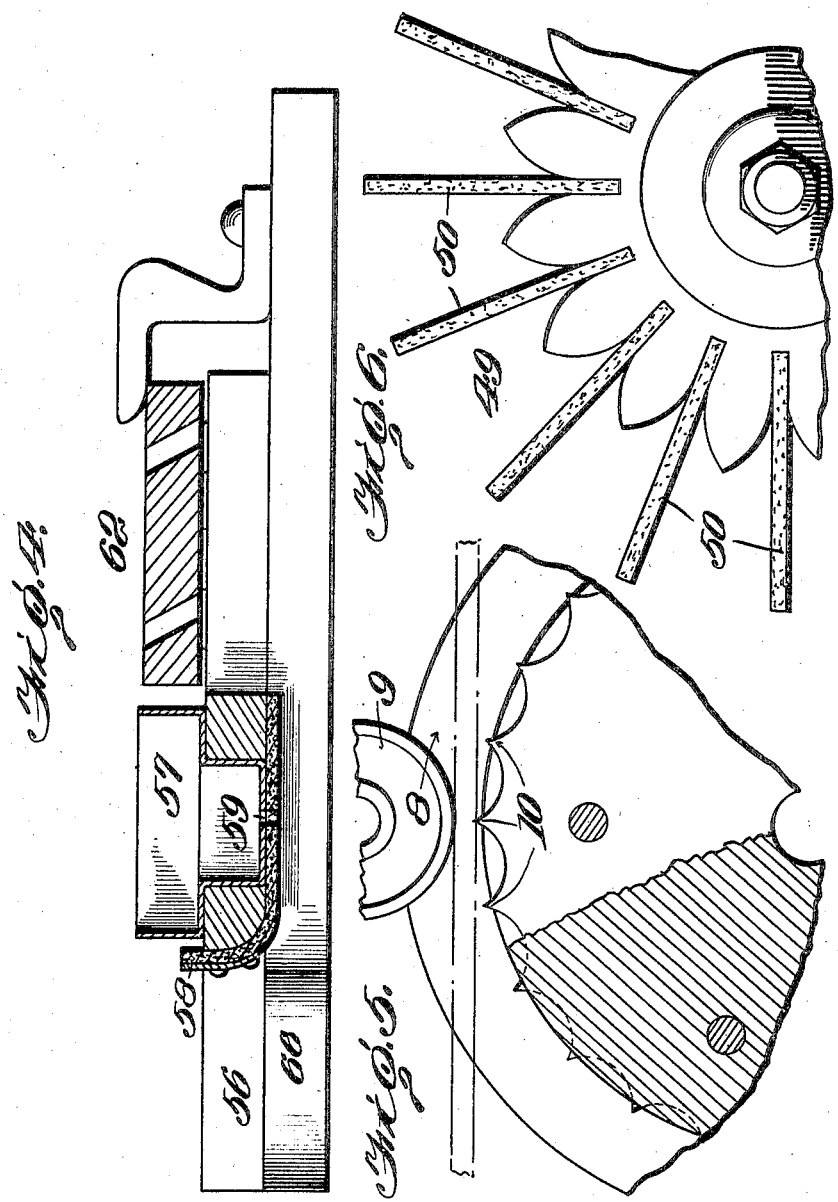

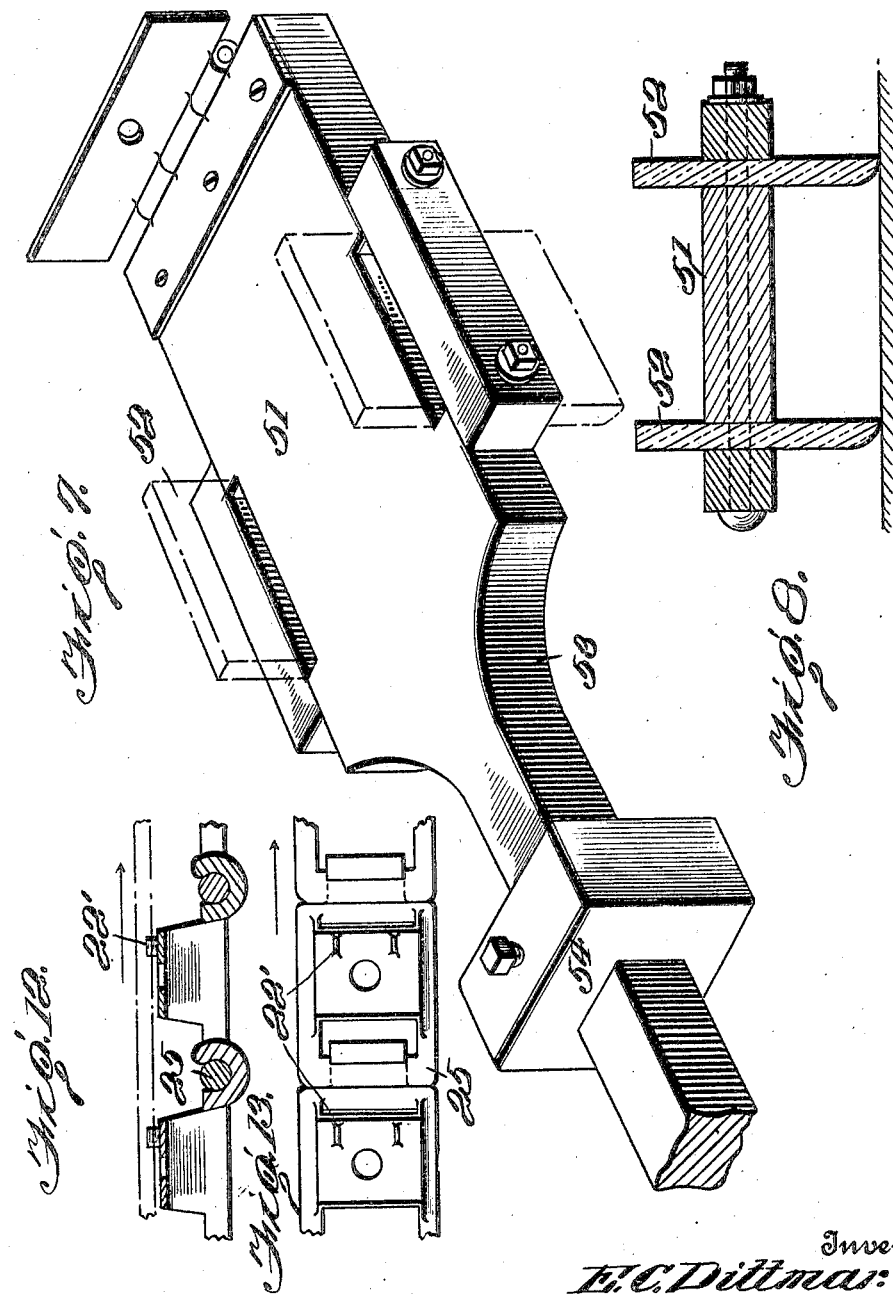

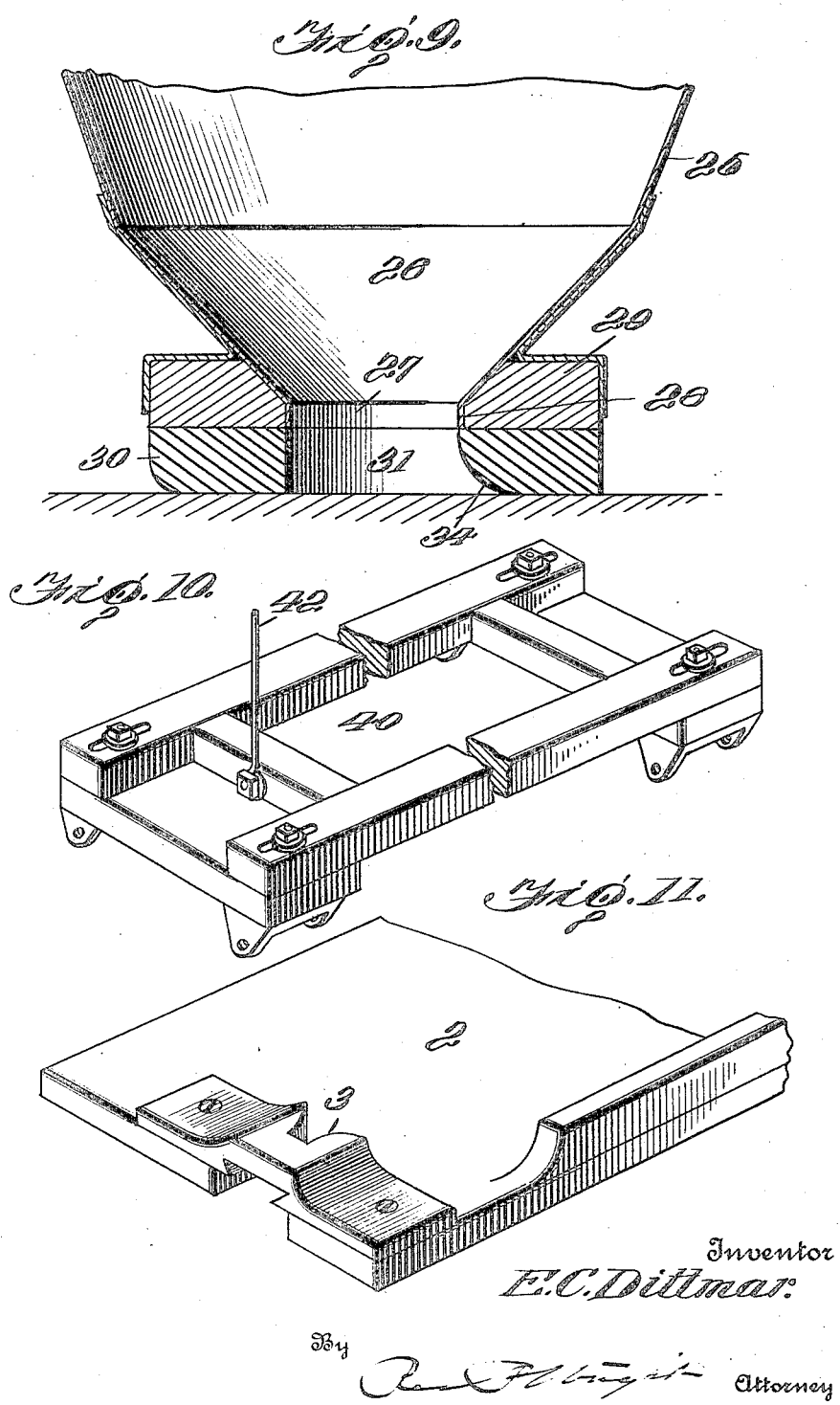

1,430,887

UNITED STATES PATENT OFFICE.

ELMER C. DITTMAR, OF WILLIAMSPORT, PENNSYLVANIA.

METHOD OF COATING AND FINISHING FLOORING.

Original application filed August 28, 1918, Serial No. 251,739. Patent No. 1,339,106. Divided and this application filed November 20, 1918. Serial No. 263,358.

*To all whom it may concern:*

Be it known that I, ELMER C. DITTMAR, a citizen of the United States, residing at Williamsport, in the county of Lycoming and State of Pennsylvania, have invented certain new and useful Improvements in Methods of Coating and Finishing Flooring, of which the following is a specification, reference being had therein to the accompanying drawing.

This invention relates to certain new and useful improvements in a method of coating and finishing flooring, and comprises a division of my application Serial Number 251,739, filed August 28, 1918, the object being to provide a method by means of which the flooring strips can be coated and finished in such a manner that all hand labor is eliminated, thereby saving the expense involved in manufacturing flooring now in use.

Another object of my invention is to provide a machine which is so constructed that the flooring strips in the passage through the same are prevented from moving out from under the trays containing the coating material until the next strip has passed under the same, thereby preventing the coating material from being wasted.

Another object of the invention is to provide a machine in which the filler is first spread on the strip and then wiped so as as to force the same into the pores of the wood.

Other and further objects and advantages of the invention will be hereinafter set forth and the novel features thereof defined by the appended claims.

Like numerals of reference refer to like parts in the several figures of the drawings.

In the drawings:

Figure 1 is a side elevation of one form of an apparatus for carrying out the method of coating and finishing flooring.

Figure 2 is a top plan of the same.

Figure 3 is a section taken on the line 3—3 of Figure 1.

Figure 4 is a longitudinal vertical section through a varnish tray and brush holder.

Figure 5 is a detail view of the feed roller partly in section.

Figure 6 is a detail view of one of the wipers.

Figure 7 is a perspective view of the burnisher holder.

Figure 8 is a transverse section through the same.

Figure 9 is a detail vertical enlarged section of the lower portion of the filler tank.

Figure 10 is a perspective view of the wiper supporting frame.

Figure 11 is a detail perspective view of the feed table.

Figure 12 is a section through a portion of the conveyor, and

Figure 13 is a plan view of the same.

In constructing an apparatus for carrying out my method of coating and finishing flooring, I employ a frame 1 which is provided with a feed table 2 having a guideway 3 through which the strips of flooring are forced. Arranged over the feed table is a brush 4 for cleaning the pores of the wood as the strips are fed into the machine, said brush being driven by a belt 5 passing over a pulley 6 carried by the power shaft 7 which is driven in any suitable way.

Arranged in alignment with the guideway 3 are a pair of feed-rollers 8 and 9, the roller 8 being grooved and having spurs 10 adapted to engage the underside of the strip of flooring in order to force the same through the machine. The roller 9 engages the upper face of the strip so as to hold the same in engagement with the spurs, and is provided with means 11 for adjusting the pressure, said means being herein shown consisting of a pair of threaded screws 13 which are adjusted so as to engage the bearings of the rollers 9 in order to apply the proper pressure.

The roller 8 is carried by a shaft 14 having a pulley 15 driven by a belt 16 extending from the power shaft 7, as clearly shown in Figure 2. The roller 9 is carried by shaft 17 which has fixed thereon the sprocket wheel 18 engaged by sprocket 19 which in turn is driven by sprocket wheel 20 carried by the shaft 14, said chain passing over an idle sprocket 21, as fully shown in Figure 1.

Arranged in alignment with the feed rollers 8 and 9 is an endless conveyor 22 which is supported in a horizontal position by angle irons 23 so as to provide a flat bed for the strips of flooring. The endless conveyor 22 is composed of a chain provided with spurs 22′ which are forced into the underside of the strip of flooring by a pressure roller 24, said roller being driven by a chain 25 from the shaft 17.

Arranged in advance of the pressure roll 24 is a tank 25 adapted to contain the filler in a semi-plastic state. The filler employed is composed of a base formed of ground silax, linseed oil, japan dryer and coloring matter with just a sufficient amount of thinner such as turpentine for a binder to allow the filler to be formed very thick so that when forced into the pores of the wood under pressure any surplus of oil is absorbed by the wood and as the filler is comparatively dry when applied it does not sink or dry in the pores of the wood or combine with the varnish which is applied directly thereon. Tank 25 has a conical lower end 26 terminating in a neck 27 which is seated in an aperture 28 formed in a block 29. Secured to the under face of the block 29 is a strip of rubber 30 provided with an opening 31, registering with the neck 27 into which the filler passes by gravity, and this strip of rubber is adapted to bear against the upper face of the strip of flooring and be held in contact therewith under pressure by a weight 32 adjustably mounted on an extension 33 of the block 29. The opening 31 has a width less than the width of the strip of flooring, and the forward edge is rounded as shown at 34 so as to wipe or cause the filler to be forced into the pores of the wood as the strip passes under the same.

The pressure of the rubber against the strip is regulated by screws 35 carried by the block 29, which limits the downward movement of the same. The filler within the tank 25 is agitated by a rod 36 mounted on an eccentric 37 secured to the power shaft 7 so as to keep the filler thoroughly agitated in order to prevent the same from hardening.

Mounted in suitable bearings in the rear of the frame is a shaft 38, which is driven by a belt 39 extending from the power shaft 7, said shaft being provided with tight and loose pulleys and a belt shifter so that the power can be applied at the will of the operator.

Mounted on a shaft 38 are a pair of frames 40 and 41 supported at their forward ends by rods 42 which are adjustably mounted at their upper ends in brackets 43 carried by the frame for the purpose hereinafter fully described.

The forward ends of the frame 40 and 41 are provided with adjustable bearings 44 in which are mounted shafts 45 carrying pulleys 46 over which pass belts 47, carried by pulleys 48 fixed on the shaft 38, one of the belts being twisted in order to drive one of the shafts 45 in a reverse direction to the other, and these shafts are arranged out of alignment for a purpose hereinafter fully described.

Fixed on the end of each of the shafts 45 is a wiper 49 having radially extending leather strips 50 which are adapted to wipe the filler placed on the strips toward the side edges of the strip of flooring. The filler applied to the strip of flooring by the tank 25 does not extend the full width of the strip, and as these wipers rotate in reverse directions the filler is forced towards the side edges at the same time the strips force the filler into the pores of the wood, so that in reality none of the filler placed on the strip by the tank is wasted.

Pivoted to the frame 1 above the conveyor are a pair of holders 51 in which are arranged burnishers 52 adapted to engage the strip in its passage over the conveyor in order to smooth the surface and to remove all rough spots. These holders are provided with extensions 53 on which are adjustably mounted weights 54 for holding the burnishers in contact with the flooring strip. The burnishers are preferably formed of glass and are rounded as shown so that the surface of the strip as it passes under the same will be finished and left in such condition that the first coat of varnish can be applied thereto.

As the strip of flooring leaves the conveyor 22 it passes onto a delivery table 55, over which is arranged the movable support 56 having a tray 57 carried thereby, the under surface of which is covered with strips of felt 58, as clearly shown in Figure 4. The bottom of the tray is provided with an opening 59, registering with an opening formed in the strips of felt through which the varnish is adapted to pass and be applied to the surface of the flooring strip.

The tray 57 is supplied with varnish through a pipe 60 extending into the reduced portion of the tray in such a manner that the varnish is prevented from overflowing by atmospheric pressure, whereby the varnish will be fed regularly to the tray so that it can be applied to the strip without any waste.

Mounted on the movable support 56 is a movable brush holder 62 in which are secured brushes 63 adapted to engage the strip so as to insure the spreading of the varnish on the strip as it passes through the machine. The movable support 56 is provided with an extension 64 on which is adjustably mounted a weight 65 for applying the proper pressure. The forward end of the movable support is provided with a guide-way 66 to insure the passage of the strip under the varnish tray.

The operation of the apparatus shown for carrying out the method of coating and finishing strips of flooring is as follows: The strip is fed from the feed table under the brush 4 and is caught by the feed rollers and carried forward over the supporting roller onto the endless conveyor, and is carried forward by this conveyor under the filler where the filler is applied. As the strip passes from under the filler tank it is engaged by the wipers which force into the pores the filler and remove all surplus. As the strip advances it is engaged by the burnishers which smooth the surface so that as it passes under the varnishing tray the varnish can be applied in such a manner as to obtain a finished surface. After the end of the strip passing through the machine leaves the feed rollers 8 and 9, it is carried forward by being pushed by the next strip, which prevents a strip from being carried out from under the filler tank and the varnish tank until the next strip has passed under the same.

I have found in practice that strips of flooring can be finished in my machine without any sand-papering operation as the filler is applied in such a manner that all the surplus is removed before it reaches the varnish tank, and I am able with this machine by using a thick or heavy filler to apply the first coat of varnish without waiting for the filler to harden.

From the foregoing description it will be seen that I have provided a machine for coating and finishing strips of flooring which is exceeding simple and cheap in construction, and one in which a great saving in material is obtained, as I have found that by using a very heavy filler in connection with the pressing and wiping action that only the right amount of filler is applied to the surface.

While in the drawings I have shown a machine having certain details of construction, I do not wish to limit myself to these features, as the main object of my invention is to coat and finish a strip of lumber by passing it through a machine so as to eliminate all hand work.

What I claim:

1. The method of coating and finishing flooring consisting in moving a strip in a normal path, and while in motion applying to the surface thereof under pressure a filler, wiping said strip crosswise of the grain for forcing the filler into the pores thereof, and then applying a coating of varnish thereto.

2. The method of coating and finishing flooring consisting in first cleaning the strip, then applying filler thereto under pressure, then wiping the filler into the pores of the strip, then burnishing the strip, and then applying a coat of varnish thereto.

3. The method of coating and finishing strips of lumber consisting in first brushing the strip to remove the dirt and open the pores thereof, second in applying filler to one face of the strip under pressure, third wiping the filler thus applied, fourth burnishing the filler, and fifth coating the strip with varnish.

4. The method of finishing and coating flooring consisting in imparting movement to the strip, cleaning the strip, then applying a plastic filler thereto under pressure, then wiping the filler into the pores of the strip, then burnishing the strip, and then applying a coating of varnish thereto.

5. The method of coating and finishing flooring consisting in moving the strip and applying to the moving strip first a heavy filler, then wiping the filler into the pores of the strip, then burnishing the strip, and then applying a coat of varnish thereto.

6. The method of finishing flooring consisting in moving the strip to be finished, applying to said moving strip under pressure a filler, wiping said filler crosswise of the grain to force the filler into the pores of the strip and to remove any surplus therefrom, and then coating the strip with varnish.

7. The method of coating strips of lumber consisting in continuously moving a strip of lumber longitudinally and while in motion first applying a heavy filler to the surface thereof and then wiping the surface of the strip of lumber containing the filler crosswise of the grain for forcing the filler into the pores of the strip and for removing any surplus filler therefrom.

8. The method of coating and finishing strips of lumber consisting in continuously moving a strip of lumber and while in motion applying a heavy filler to the surface thereof, then wiping the surface of the strip crosswise of the grain for forcing the filler into the pores of the strip and then burnishing the filler.

9. The method of finishing strips of lumber consisting in continuously moving the strip of lumber and while in motion applying a heavy filler thereto, then wiping the surface of the strip crosswise of the grain for forcing the filler into the pores of the strip while in motion and then applying a coat of varnish thereto.

10. The herein described method of coating strips of lumber which consists in applying continuously to the surface of the strip a filler semi-plastic material and simultaneously pressing and forcing the filler into the pores of the wood and wiping said surface crosswise of the grain to further force the filler into the pores of the wood and to remove any surplus material therefrom.

In testimony whereof I hereunto affix my signature in the presence of two witnesses.

ELMER C. DITTMAR.

Witnesses:
OLIVER J. DECKER,
HENRY P. DECKER.